(12) United States Patent
Lorentz

(10) Patent No.: US 9,010,015 B2
(45) Date of Patent: Apr. 21, 2015

(54) JIG FISHING LURE

(76) Inventor: Daniel R. Lorentz, Wadena, MN (US)

( * ) Notice: Subject to any disclaimer, the term of this patent is extended or adjusted under 35 U.S.C. 154(b) by 354 days.

(21) Appl. No.: 13/555,555

(22) Filed: Jul. 23, 2012

(65) Prior Publication Data

US 2013/0019517 A1 Jan. 24, 2013

Related U.S. Application Data

(60) Provisional application No. 61/510,336, filed on Jul. 21, 2011.

(51) Int. Cl.
*A01K 91/00* (2006.01)
*A01K 85/00* (2006.01)

(52) U.S. Cl.
CPC ...................... *A01K 85/00* (2013.01)

(58) Field of Classification Search
USPC ................... 43/42.39, 44.81, 42.44
See application file for complete search history.

(56) References Cited

U.S. PATENT DOCUMENTS

| | | | | |
|---|---|---|---|---|
| 1,611,644 A | | 12/1926 | Johnson | |
| 2,484,744 A | * | 10/1949 | Roman | 43/42.06 |
| 3,341,966 A | * | 9/1967 | Pippen | 43/43.15 |
| 3,803,747 A | * | 4/1974 | Cartwright | 43/42.28 |
| 3,855,722 A | | 12/1974 | Moore | |
| 3,909,974 A | * | 10/1975 | Kent | 43/42.31 |
| 3,965,606 A | | 6/1976 | Bingler | |
| 4,470,217 A | | 9/1984 | Adams | |
| 4,751,789 A | | 6/1988 | Devereaux | |
| 4,920,688 A | * | 5/1990 | Devereaux et al. | 43/42.39 |
| D324,407 S | | 3/1992 | Snyder | |
| 5,203,105 A | * | 4/1993 | Bond et al. | 43/42.39 |
| D372,954 S | | 8/1996 | Coniglio et al. | |
| D560,749 S | | 1/2008 | Moore | |
| 7,694,453 B1 | * | 4/2010 | Arrico | 43/42.13 |
| 7,748,157 B1 | | 7/2010 | Hellmann | |
| D642,237 S | | 7/2011 | Simmons | |
| 8,186,096 B2 | | 5/2012 | Rubin et al. | |
| 8,468,737 B2 | * | 6/2013 | Simmons | 43/42.39 |
| D687,122 S | | 7/2013 | Simmons | |
| 2010/0229454 A1 | * | 9/2010 | Cunningham | 43/42.31 |
| 2013/0081321 A1 | * | 4/2013 | Lund | 43/43.13 |

OTHER PUBLICATIONS

Application and File History for U.S. Appl. No. 29/442,388, filed Feb. 21, 2013; Inventor: Daniel R. Lorentz.

* cited by examiner

*Primary Examiner* — Christopher P Ellis
(74) *Attorney, Agent, or Firm* — Patterson Thuente Pedersen P.A.

(57) ABSTRACT

A fishing lure comprised of a jighead and a barbed hook movably coupled to the jighead. The jighead fixedly carries a first jighead eye for attaching the jighead to a fishing line and the barbed hook is movably coupled in several degrees of freedom to the jighead, and the plane defined by the barbed hook is shiftable around a position where it is aligned with the first eye plane. The barbed hook is shiftable, in several degrees of freedom, around the plane defined by a eye.

6 Claims, 7 Drawing Sheets

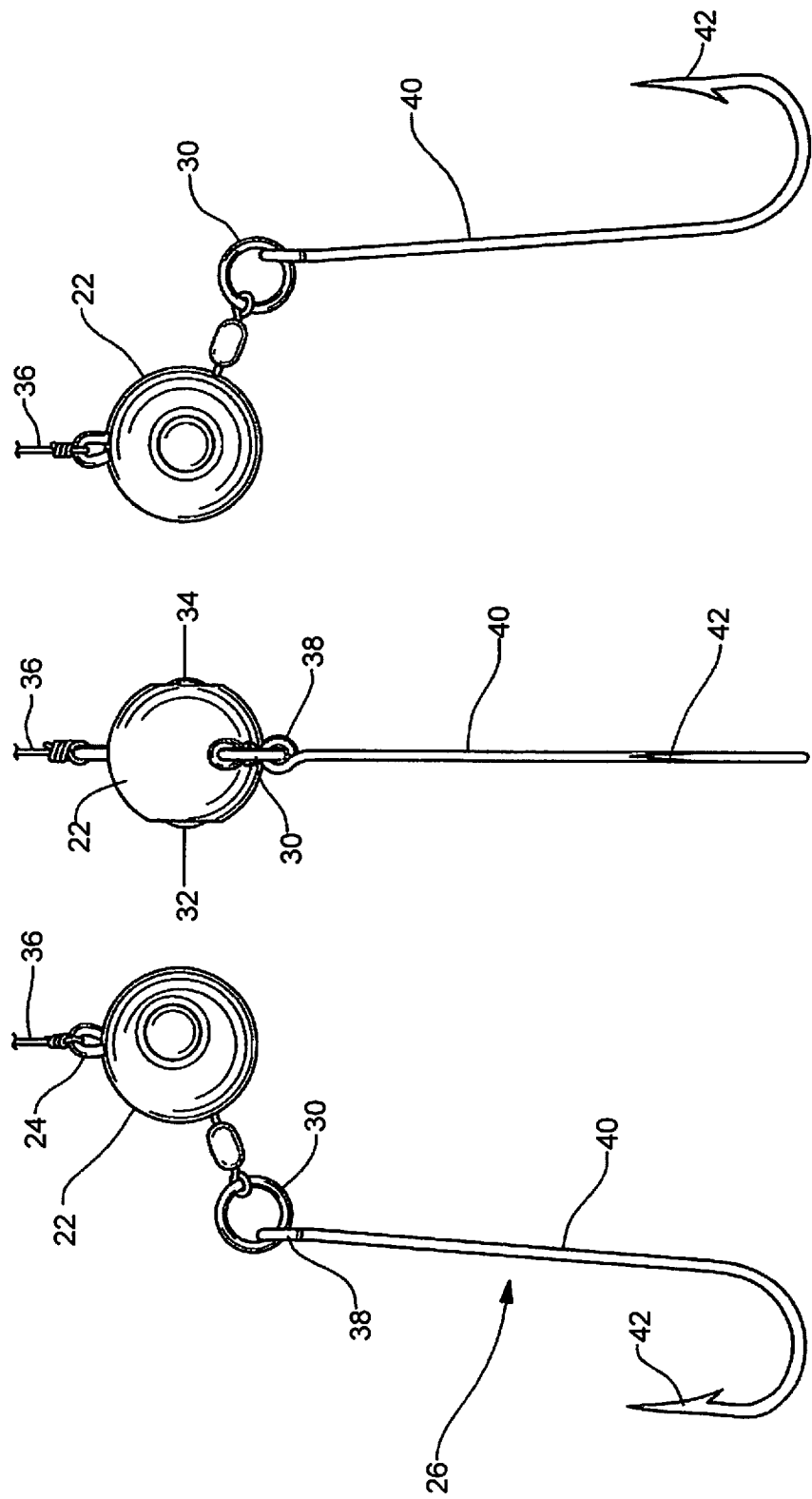

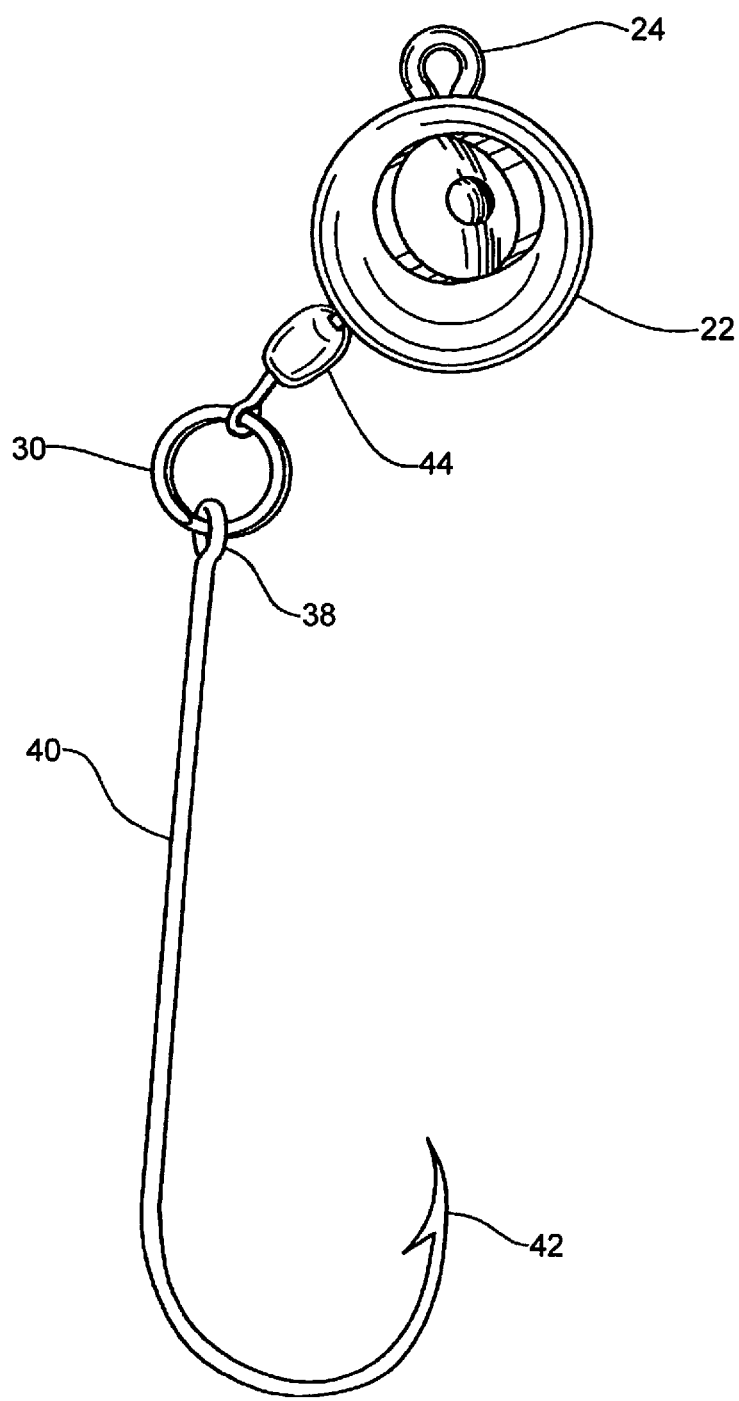

JIG FISHING LURE

RELATED APPLICATION

The present application claims the benefit of U.S. Provisional Application No. 61/510,336 filed Jul. 21, 2011, which is incorporated herein in its entirety by reference.

FIELD OF THE INVENTION

The present invention relates to the field of fishing lures, and more particularly to fishing jig lures having a barbed hook pivotably coupled to a weighted body.

BACKGROUND OF THE INVENTION

Jigs are a popular type of fishing lure and are used to fish for a wide variety of fish species. Jigs are typically characterized as having a barbed hook partially embedded within a weighted body. Typically the weighted body, often called a jighead, is constructed of lead molded onto the shank of a fishhook and coated with colored paint. The jighead can consist of many different shapes and colors along with different features.

Live bait, such as a worm, leech, or minnow, is typically used as bait in conjunction with jigs. The hydrodynamic drag of the baited hook in combination with the relative heavy weight of the jighead is purposefully designed to create a jerky vertical motion as the jig passes through the water. This irregularity in motion through the water is believed to be particularly useful in attracting fish.

Examples of a fishing jigs specifically designed for their exaggerated irregular motion through the water include: U.S. Pat. No. 1,611,644, issued on Dec. 21, 1926, to Otis Johnson, disclosing a fishing lure than can rotate to simulate the movements of a frightened fish; U.S. Pat. No. 3,965,606, issued Jun. 29, 1976, to Donald J. Bingler, disclosing a jighead employing a ball chain as a connector and swivel to give the fishing jig a wiggling illusion; and U.S. Pat. No. 7,748,157, issued on Jul. 6, 2010, to Paul Hellmann, disclosing a fishing jig with a flat bottom and shorter semi-hour glass shaped rudder which causes the fishing jig to move through the water like a wounded minnow.

Although many types of fishing jigs have been proposed and used for a number of years, there is still room for improvement. In particular, one problem with prior jig designs is that because the barbed hook and jighead are traditionally molded together, movement of the live bait does not cause the jig to move as freely as if the barbed hook and jighead were attached by a more flexible coupling.

Another problem noted with prior fishing jig designs is that often the live bait used in conjunction with a jig is much longer than traditional hooks will accommodate. For example, when a worm is placed on a hook, often times the length of the worm will extend beyond the boundaries of the hook; even when the worm is wrapped around and punctured with the hook several times. In some cases this allows fish to eat portions of the worm without swallowing the hook. In other cases, the added drag on the free hanging portion of the worm as the jig is pulled through the water will cause the worm to become unhooked. Both cases result in an inefficient use of live bait.

SUMMARY OF THE INVENTION

In one embodiment the fishing lure of the present invention is generally comprised of a weighted jighead, a retrival eye, a barbed hook, a swivel assembly, and a ring which pivotally interconnects the barbed hook to the swivel assembly. The jighead is substantially spherical in shape with two smaller convex semi-spheres recessed within and positioned on opposite lateral sides of the larger jighead sphere. The smaller convex semi-spheres are painted a distinctive and different color than the rest of the jighead for the purpose of resembling eyeballs. The retrieval eye is fixedly coupled to the jighead for attaching a fishing line to the fishing lure. The barbed fishing hook is comprised of a hook eye interconnected to an elongated shaft, the elongated shaft is defined by a curve and terminates with a barb. The swivel assembly is comprised of a first rotary swivel line connector, a second rotary swivel line connector, and a swivel body. The first and second rotary swivel line connectors are each comprised of an eyelet interconnected to a shaft, the distal end of each shaft is defined by a flanged edge. The swivel body has a hollow interior with a first hole and a second hole extending from the exterior surface of the body to the hollow interior. The first and second holes are positioned on opposite sides of the body and appropriately sized large enough to allow either of the rotary swivel line connector shafts to pass through and rotate freely within the hole, yet small enough to prevent either flange from passing through the hole. The first and second rotary swivel line connectors are each coupled to swivel body such that the flanged edges reside within the hollow interior, the first and second rotary swivel line connector shafts respectively pass through the first and second defined holes in the swivel body, and the eyelets are accessible from the exterior of the swivel body. One end of the swivel assembly is fixedly coupled to and partially embedded within the jighead, while the other end of the swivel assembly is pivotally coupled to the barbed fishing hook via the ring.

In an alternative embodiment the fishing lure of the present invention is generally comprised of a weighted jighead, a first eye, a second eye, a barbed fishing hook, and a ring which pivotally interconnects the second eye to the barbed fishing hook.

It is this pivotable coupling between the jighead and the barbed hook, facilitated by either the swivel assembly and ring or the second eye and ring, that enables increased movement of the jig when live bait is attached. As a result, in addition to the intentional jerky movement through the water caused by the weighted head and the hydrodynamic drag of the hook and bait, movement of the jig is accentuated by each corresponding movement of the live bait. Unlike the prior art, this erratic movement can continue even when the jig is stationary in the water.

The present invention can also employ a barbed hook with an extended elongated shaft. The extension of the longitudinal shaft enables the entire live bait to be placed within the confines of the hook. This mitigates against inefficient use of live bait, and as an added benefit provides a better grip for the fisherman when handling the jig. This added ease in handling enables the jig fishing lure to be baited more quickly, and enables for greater ease when removing the jig fishing lure from the mouth of a fish.

BRIEF DESCRIPTION OF THE DRAWINGS

FIG. 7 is a right side view of a jig fishing lure, with a barbed hook and jighead connected with a swivel and ring assembly;

FIG. 8 is a front view of a jig fishing lure, with a barbed hook and jighead connected with a swivel and ring assembly;

FIG. 9 is a left side view of a jig fishing lure, with a barbed hook and jighead connected with a swivel and ring assembly;

FIG. 10 is a right side view of a jig fishing lure, with a barbed hook and jighead connected with a swivel and ring assembly.

DETAILED DESCRIPTION OF THE INVENTION

Figure 1:
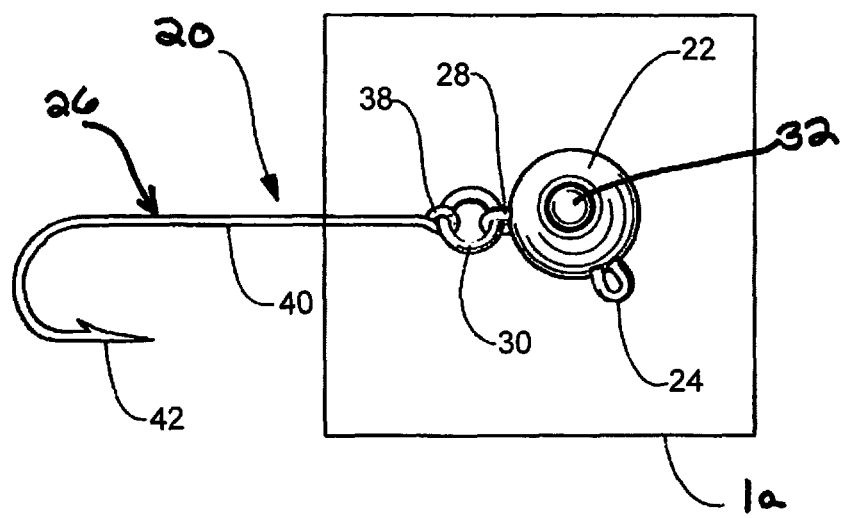
FIG. 1 depicts a jig fishing lure, with a barbed hook and jighead connected with a ring assembly.
Figure 1A:
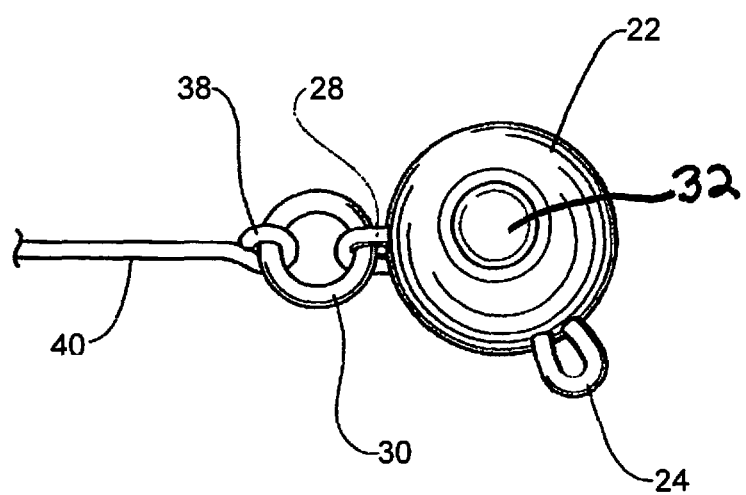
FIG. 1a is an enlarged view of the area annotated 1a in FIG. 1.
Figure 2:
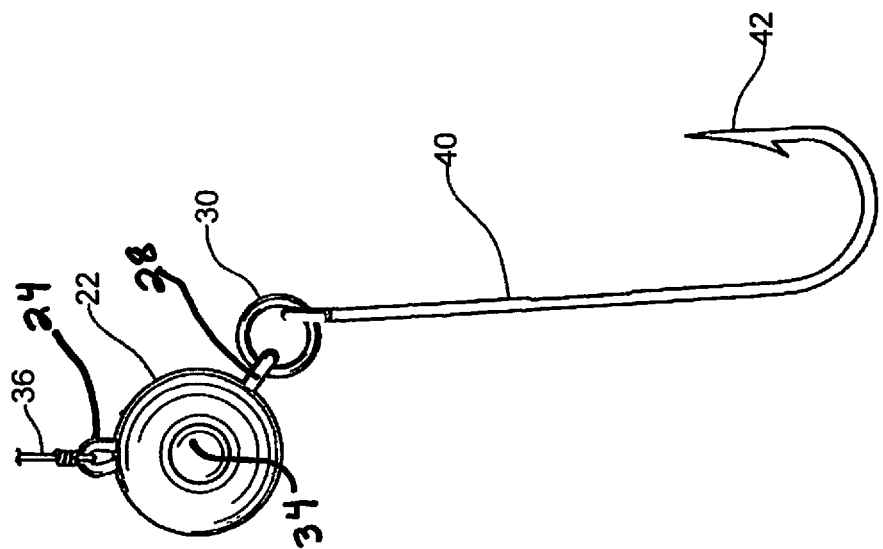
FIG. 2 is a right side view of a jig fishing lure, with a barbed hook and jighead connected with an eye and ring assembly.
Figure 3:
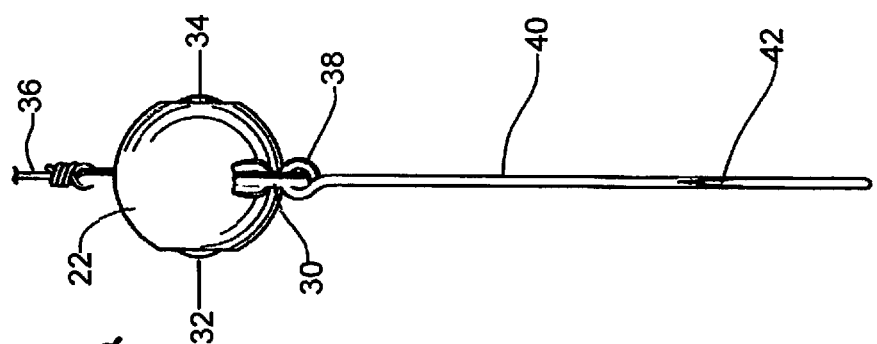
FIG. 3 is a front view of a jig fishing lure, with a barbed hook and jighead with an eye and ring assembly.
Figure 4:
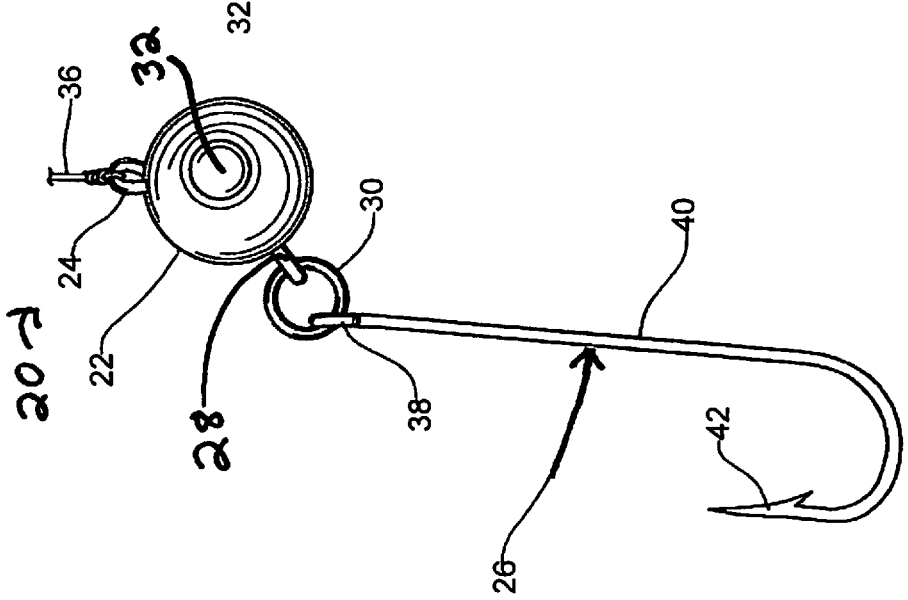
FIG. 4 is a left side view of a jig fishing lure, with a barbed hook and jighead with an eye and ring assembly.
Figure 5:
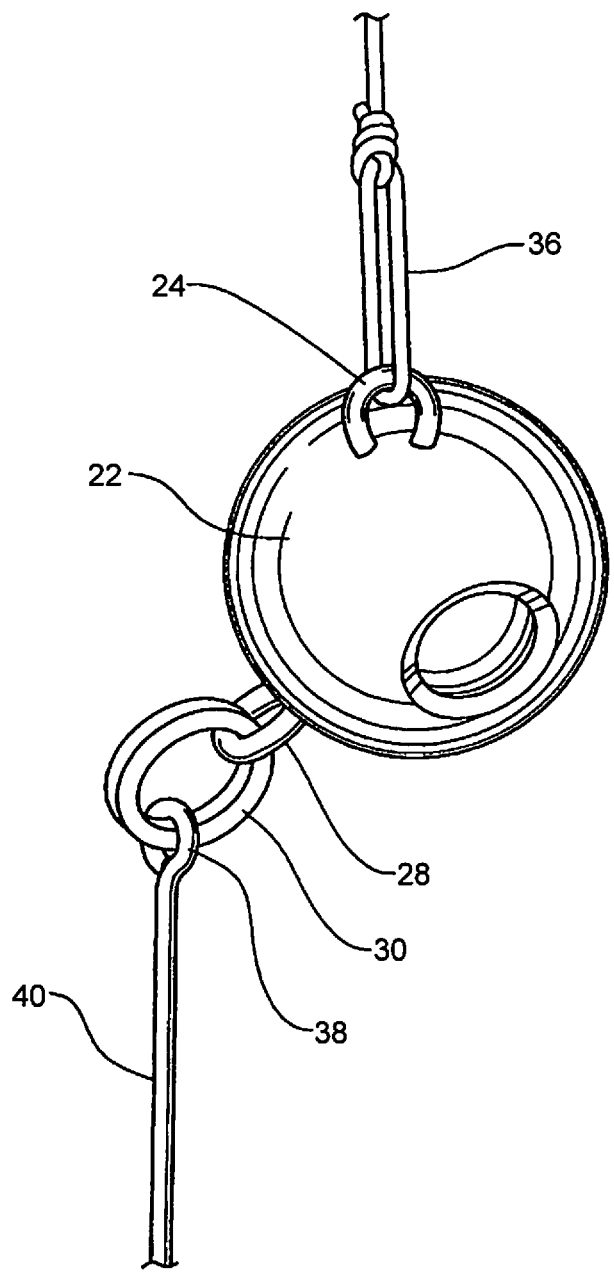
FIG. 5 is an enlarged, fragmentary, perspective view of the eye and ring assembly.
Figure 6:
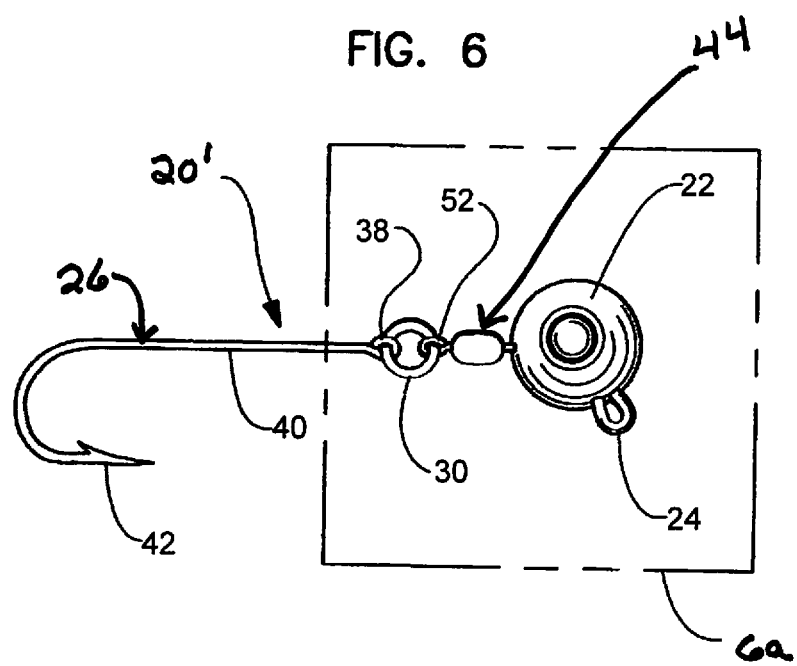
FIG. 6 depicts a jig fishing lure, with a barbed hook and jighead connected with a swivel and ring assembly.
Figure 6A:
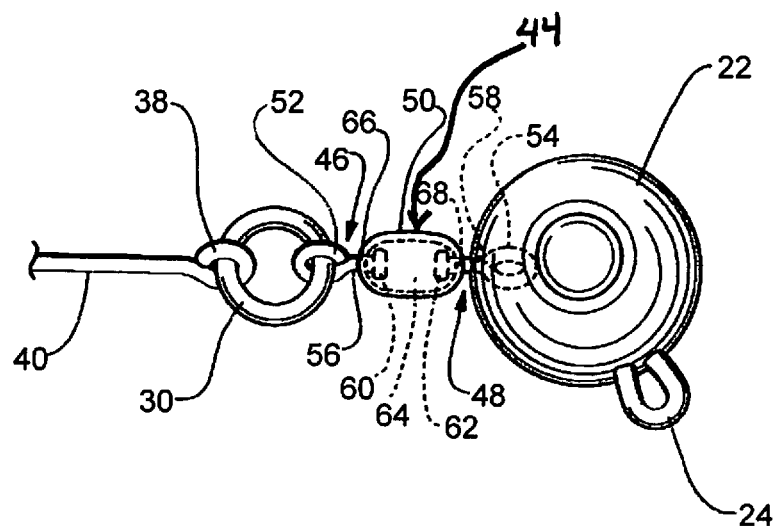
FIG. 6a is an enlarged view of the area annotated 6a in FIG. 6.
Figure 11:
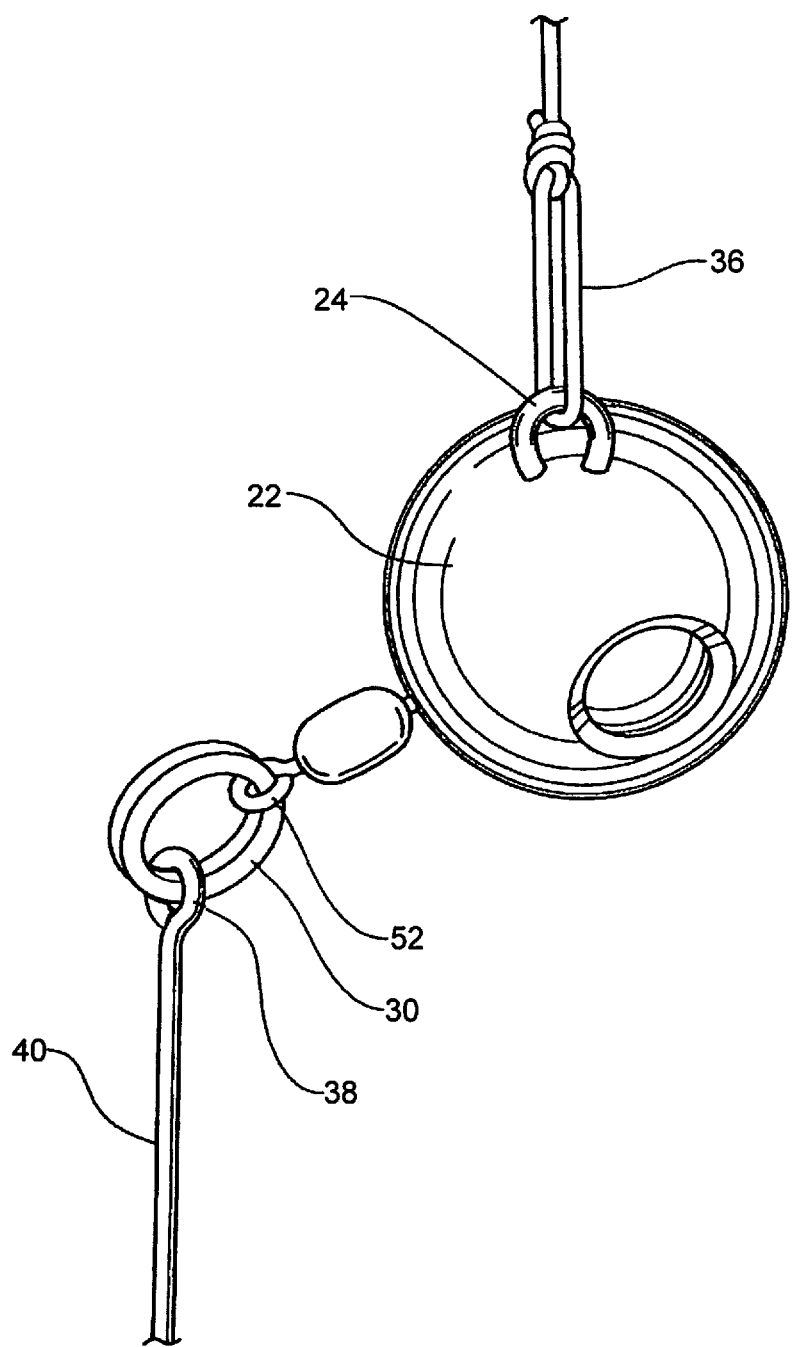
FIG. 11 is an enlarged, fragmentary, perspective view of the swivel and ring assembly.

One embodiment of the jig fishing lure 20 of the present invention is featured in FIGS. 1 through 5. An alternative embodiment of the jig fishing lure 20' is featured in FIGS. 6-11.

The jig fishing lure 20 is generally comprised of a weighted jighead 22, a first eye 24, a barbed hook 26, a second eye 28, and a ring 30 which pivotally interconnects the barbed hook 26 to the second eye 28.

Although jighead 22 can be constructed in a variety of shapes and sizes to accommodate the needs of the user, jighead 22, as depicted in FIG. 1, is substantially spherical in shape. The jighead 22 has two smaller convex semi-spheres 32 and 34 recessed within and positioned on opposite lateral sides of the larger jighead sphere 22. Jighead 22 can be constructed of lead, but can also be constructed of any heavier than water material. Jighead 22 can vary in weight from approximately 1/16 of an ounce to 1/2 of an ounce.

The smaller convex semi-spheres 32 and 34 can be painted a different color than that of the rest of the jighead for the purpose of resembling eyeballs. For example convex semi-spheres 32 and 34 can be painted white, yellow, black, or red. Convex semi-spheres 32 and 34 can also have spots of a contrasting color painted within the first colored area for the purpose of simulating a pupil within each eyeball. The rest of jighead 22 can be painted in a variety of other colors and/or configured with a variety of patterns. A nonexclusive list of these colors includes: bubblegum pink, lime, orange, red, chartreuse, ochre, pink, gold, black, silver, silver speckled, a combination of lime and chartreuse, a combination of pearl white and blue, a combination of pearl white and pink, a combination of pearl white and purple, white with a yellow eye, white with a black eye, white with a red eye, glow-in-the-dark pink, glow-in-the-dark orange, glow-in-the-dark bubblegum pink, glow-in-the-dark blue, a combination of glow-in-the-dark pink and glow-in-the-dark white, and glow-in-the-dark white with a red eye.

First eye 24 is fixedly coupled to jighead 22 for attaching a fishing line 36 to the fishing lure 20. First eye 24 can be constructed of wire and partially embedded within jighead 22. The first edge defines a first eye plane.

Barbed fishing hook 26 is comprised of a hook eye 38 interconnected to an elongated shaft 40, the elongated shaft 40 is defined by a curve and terminates with a barb 42. The hook eye defines a hook eye plane.

Second eye 28 is fixedly coupled to jighead 22. Second eye 28 can be constructed of wire and partially embedded within jighead 22. The second eye 28 defines a second eye plane that can be oriented traverse, or even substantially perpendicular to, the first eye plane. Configuration in this manner has a tendency to allow greater movement of barbed hook 26 relative to jighead 22 in line with the direction of movement of fishing jig 20 through the water when in use.

Ring 30 pivotably connects barbed fishing hook 26 to second eye 28. Specifically, ring 30 passes through both hook eye 38 and second eye 28. Thus, ring 30 links jighead 22 and barbed fishing hook 26 in a manner that enables barbed fishing hook 26 to move in several degrees of freedom in movement relative to jighead 22. The ring defines a ring plane, such that when the ring is received through the second eye 28 and the hook eye 38, the ring plane is transverse to the second eye plane, and the hook eye plane. As depicted in FIG. 1, for instance, depending on the orientation of the hook eye plane with respect to the shaft of the barbed hook, the barbed hook is movable in several degrees of freedom with respect to the jighead, and the orientation of the plane presented by the barbed hook can be shiftable around a position where it is aligned with the first eye plane.

In an alternative embodiment fishing lure 20' is generally comprised of a weighted jighead 22, a first eye 24, a barbed hook 26, a swivel assembly 44, and a ring 30 which pivotally interconnects the barbed hook 26 to the swivel assembly 44.

The swivel assembly 44 is comprised of a first rotary swivel line connector 46, a second rotary swivel line connector 48, and a swivel body 50. The first and second rotary swivel line connectors 46 and 48 are each comprised of an eyelet 52 and 54 interconnected to respective shafts 56 and 58, the distal end of each shaft defined by a flanged edge 60 and 62. The swivel body 50 has a hollow interior 64 with a first hole 66 and a second hole 68 extending from the exterior surface of the body 50 to the hollow interior 64. The first and second holes 66 and 68 are positioned on opposite sides of body 50 and appropriately sized large enough to allow respective rotary swivel line connector shafts 56 or 58 to pass through and rotate freely within the hole 66 or 68, yet small enough to prevent either flange 60 or 62 from passing through. The first and second rotary swivel line connectors 46 and 48 are each coupled to swivel body 50 such that the flanged edges 60 and 62 reside within the hollow interior 64, and the first and second rotary swivel line connector shafts 56 and 58 respectively pass through the first and second defined holes 66 and 68 in the swivel body 50, such that the eyelets 52 and 54 are accessible from the exterior of swivel body 50.

One end of swivel assembly 44 is fixedly coupled to and partially embedded within the jighead 22 and the other end of swivel assembly 44 is pivotally coupled to barbed fishing hook 26 via ring 30. Specifically, ring 30 passes through both hook eye 38 and either swivel eye 52 or 54. Thus, ring 30 links jighead 22 with barbed fishing hook 26 in a manner that enables barbed fishing hook 26 to move in several degrees of freedom in movement relative to jighead 22.

In another embodiment, one of jig fishing lure 20 or 20' distinguishing features can be an elongated longitudinal shaft 40 on barbed fishing hook 26. The longitudinal extension of shaft 40 allows for a larger portion of live bait to be placed on barbed hook 26, thereby reducing the chances that the bait will need to be replaced prematurely. The extension of shaft 40 also provides a longer moment arm between the center of drag, which generally is closer to the barb 42 of barbed fishing hook 26 (when live bait is attached), and the center of mass, which is typically near the center of mass of the jighead 22. This increased moment arm tends to accentuate the intended jerky movement of the jig fishing lure 20 or 20' when in use.

Fishing lure 20' can be constructed by casting the jighead from molten lead. In the casting process a retrieval eye 70 is positioned in a die (not featured) such that at least a portion of retrieval eye 70 is not within the cavity of the die. A swivel 44 is also positioned in the die such that at least a portion of the swivel 44 is not within the cavity of the die. Molten lead is then introduced into the cavity of the die. The molten lead may be either poured into the die in a molten state or metal bits may be placed into the die heated to their melting point. The molten lead is then allowed to solidify to form a cast portion (i.e., jighead 22). Jighead 22 is removed from the die and is painted. Jighead 22 is painted a first color, and the smaller convex semi-spheres 32 and 34 are painted a second color. Barbed hook 26 is connected to the portion of swivel 44 protruding from the jighead 22 via ring 30. The steps in the method of making may vary in chronological order.

Fishing lure 20 can be constructed through the same method with the exception that swivel 44 is replaced with a second eye 28.

What is claimed is:

1. A fishing lure comprising:
   a weighted jighead, the jighead being substantially spherical in shape with two smaller convex semi-spheres recessed within and positioned on opposite lateral sides of the larger jighead sphere and painted a distinctive color for the purpose of resembling eyeballs;
   a retrieval eye fixedly coupled to the jighead for attaching a fishing line to the fishing lure;
   a barbed fishing hook having a hook eye interconnected to an elongated shaft, the elongated shaft defined by a curve and terminating with a barb; and
   a swivel fixedly coupled to and partially embedded within the jighead; and a ring movably interconnecting the swivel to the barbed fishing hook such that the barbed fishing hook can move independently of the swivel.

2. The fishing lure according to claim 1 wherein the swivel is comprised of a first rotary swivel line connector, a second rotary swivel line connector, and a swivel body;
   the first and second rotary swivel line connectors each comprised of an eyelet interconnected to a shaft, the distal end of each shaft defined by a flanged edge;
   the swivel body having a hollow interior with a first hole and a second hole extending from the exterior surface of the body to the hollow interior, the first and second hole positioned on opposite sides of the body and appropriately sized large enough to allow either rotary swivel line connector shaft to pass through and rotate freely within the hole, yet small enough to prevent either flange from passing through;
   the first and second rotary swivel line connectors each coupled to swivel body such that the flanged edges reside within the hollow interior, and the first and second rotary swivel line connector shafts respectively pass through the first and second defined holes in the swivel body, such that the eyelets are accessible from the exterior of the swivel body.

3. The fishing lure according to claim 1 wherein the weighted jighead is between approximately $1/16$ to $1/2$ of an ounce in weight.

4. A fishing lure comprising:
   a weighted jighead, the jighead being substantially spherical in shape with two smaller convex semi-spheres recessed within and positioned on opposite lateral sides of the larger jighead sphere and painted a distinctive color for the purpose of resembling eyeballs;
   a first eye fixedly coupled to the jighead for attaching a fishing line to the fishing lure;
   a second eye fixedly coupled to the jighead distal to the first eye;
   a barbed fishing hook comprised of a hook eye interconnected to an elongated shaft, the elongated shaft defined by a curve and terminating with a barb; and
   a ring movably interconnecting the second eye to the barbed fishing hook such that the barbed fishing hook can move independently of the second eye.

5. The fishing lure according to claim 4 wherein the weighted jighead is between approximately $1/16$ to $1/2$ of an ounce in weight.

6. A method a making a fishing lure comprising:
   positioning a retrieval eye in a die such that at least a portion of the retrieval eye is not within the cavity of the die;
   positioning a swivel in a die such that at least a portion of the swivel is not within the cavity of the die;
   introducing molten lead into the cavity of the die;
   allowing the molten lead to solidify to form a cast portion;
   removing the cast portion from the die;
   painting the cast portion a first color;
   painting eyes on the cast portion a second color; and
   linking a barbed hook to the portion of the swivel protruding from the cast portion via a ring.

* * * * *